United States Patent
Michels

(10) Patent No.: US 9,307,744 B2
(45) Date of Patent: Apr. 12, 2016

(54) SYSTEM AND METHOD FOR GRASPING AN OBJECT

(71) Applicant: Mark Michels, Ft. Eustis, VA (US)

(72) Inventor: Mark Michels, Ft. Eustis, VA (US)

(*) Notice: Subject to any disclaimer, the term of this patent is extended or adjusted under 35 U.S.C. 154(b) by 127 days.

(21) Appl. No.: 13/788,726

(22) Filed: Mar. 7, 2013

(65) Prior Publication Data

US 2013/0327281 A1 Dec. 12, 2013

Related U.S. Application Data

(60) Provisional application No. 61/656,405, filed on Jun. 6, 2012.

(51) Int. Cl.
| *A01K 15/04* | (2006.01) |
| *A01K 15/00* | (2006.01) |
| *B25J 1/04* | (2006.01) |
| *F41A 23/06* | (2006.01) |

(52) U.S. Cl.
CPC ............. *A01K 15/003* (2013.01); *B25J 1/04* (2013.01); *F41A 23/06* (2013.01)

(58) Field of Classification Search
CPC ... A01K 15/003; A01K 15/00; A01K 15/029; A01K 29/00
USPC .............. 119/799–808; 42/94; D22/119, 121, D22/134, 149, 199; 294/104
See application file for complete search history.

(56) References Cited

U.S. PATENT DOCUMENTS

| | | | | | |
|---|---|---|---|---|---|
| 1,208,624 | A | * | 12/1916 | Newman | 119/801 |
| 2,469,865 | A | * | 5/1949 | Crow | 294/104 |
| 2,807,495 | A | * | 9/1957 | Pillstrom | 294/104 |
| 3,105,715 | A | * | 10/1963 | Happ | 294/61 |
| 3,292,591 | A | * | 12/1966 | Wood | 119/804 |
| 3,319,609 | A | * | 5/1967 | Pickard et al. | 119/804 |
| 3,949,514 | A | * | 4/1976 | Ramsey | 43/87 |
| 4,160,563 | A | * | 7/1979 | Whitney | 294/104 |
| 4,676,021 | A | * | 6/1987 | Groba | 42/94 |
| 4,811,750 | A | * | 3/1989 | McAllister | 135/66 |
| 4,882,869 | A | * | 11/1989 | Webster | 42/94 |
| 5,823,592 | A | * | 10/1998 | Kalidindi | 294/24 |
| 6,058,953 | A | * | 5/2000 | Stefanelli | 135/66 |
| 6,293,601 | B1 | * | 9/2001 | Johnson | 294/26 |
| 2003/0042388 | A1 | * | 3/2003 | Peterson | 248/440.1 |
| 2012/0060878 | A1 | * | 3/2012 | Thiessens | 135/66 |

* cited by examiner

*Primary Examiner* — Joshua Huson

(57) ABSTRACT

A system for grasping an object comprises a telescoping rod comprising a plurality of telescoping sections slidably connected to and lockable relative to each other, a handling portion located at one end of the telescoping rod, and a grasping portion located at an opposite end of the telescoping rod, the grasping portion comprising a movable portion having an ungrasped position and a grasped position, wherein the grasping portion is connected to the handling portion and the handling portion is configured to move the movable portion of the grasping portion from the ungrasped position to the grasped position.

8 Claims, 4 Drawing Sheets

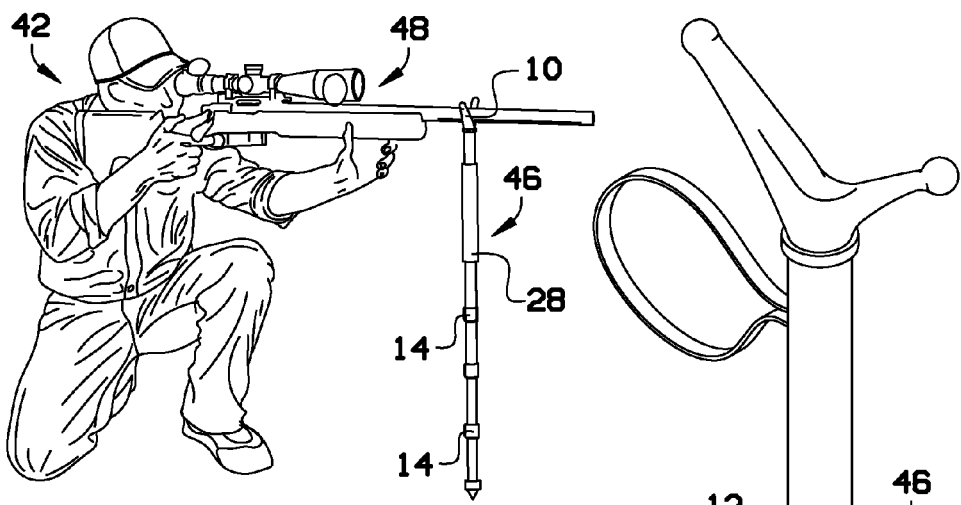
FIG.1
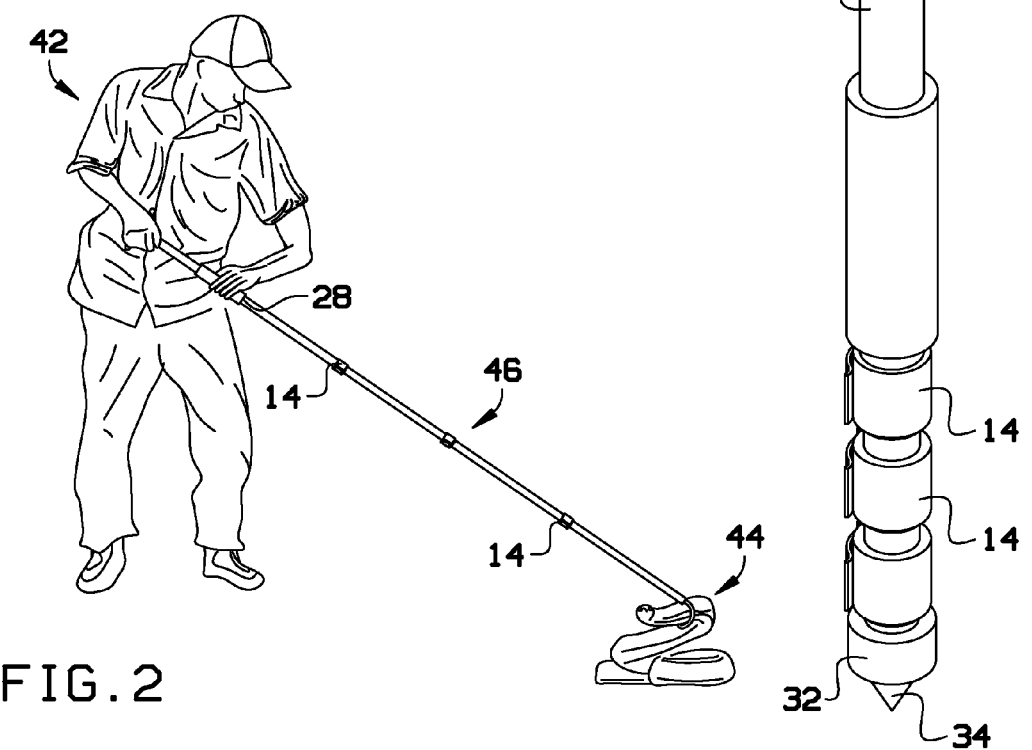
FIG.2
FIG.3

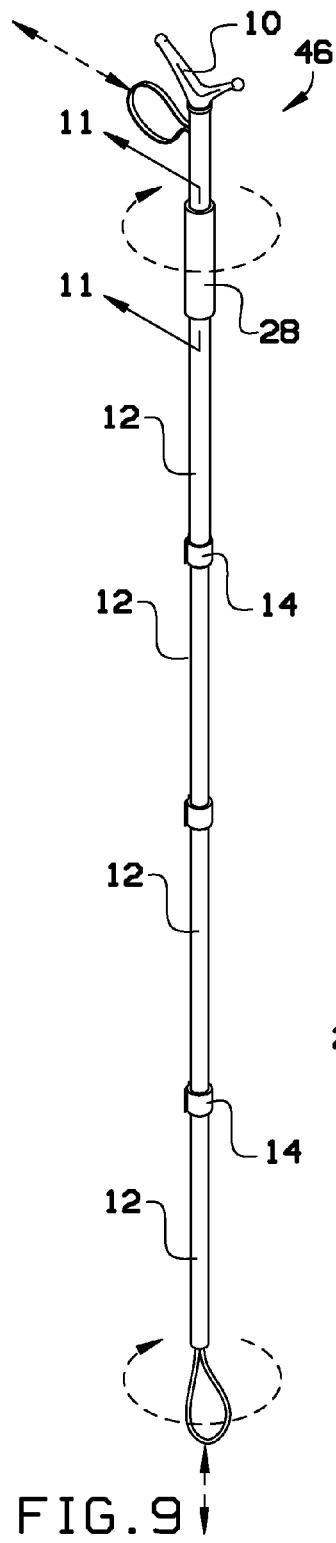
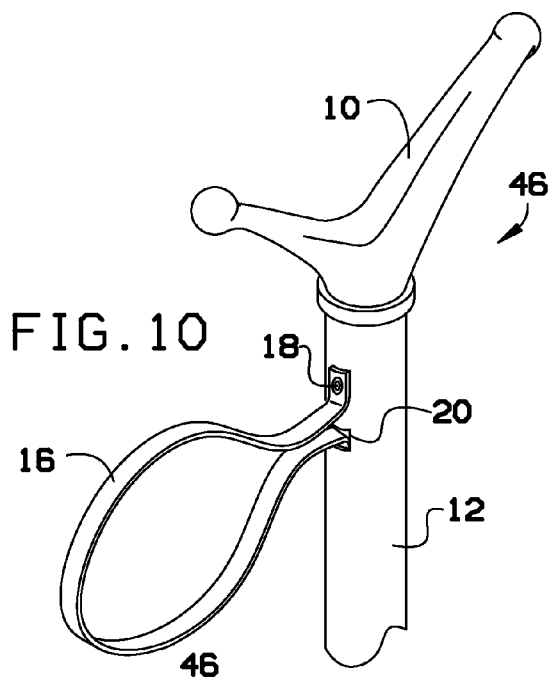
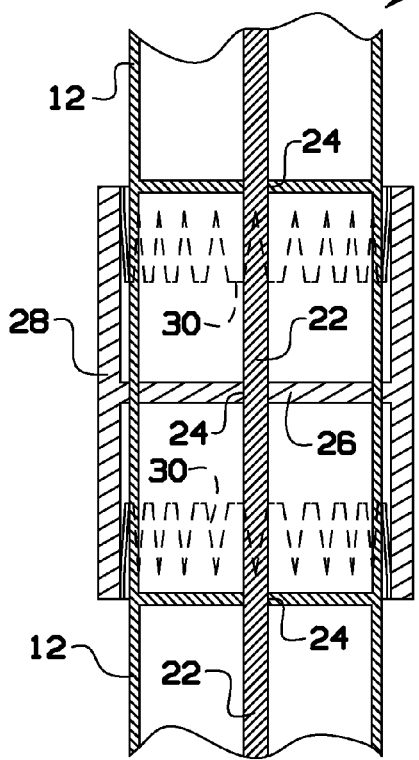
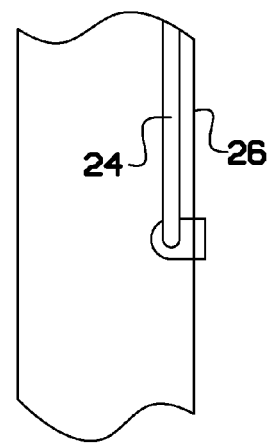
FIG. 9
FIG. 10
FIG. 11A
FIG. 11B

SYSTEM AND METHOD FOR GRASPING AN OBJECT

REFERENCE TO RELATED APPLICATION

This application claims the benefit of U.S. Provisional Patent Application No. 61/656,405, filed Jun. 6, 2012, entitled, "Various telescoping mechanisms to transfer rotational or linear movement from one end to the other in order to open and close by multiple methods."

BACKGROUND OF THE INVENTION

The present invention relates to various telescoping mechanisms to transfer rotational or linear movement from one end to the other in order to open and close by multiple methods.

Other mechanisms transfer movement but only through a straight shaft, and they do not have the capability to collapse into smaller sections.

As can be seen, there is a need for solutions to these and other problems.

SUMMARY OF THE INVENTION

In one aspect of the present invention, a system for grasping an object comprises: a telescoping rod comprising a plurality of telescoping sections slidably connected to and lockable relative to each other; a handling portion located at one end of the telescoping rod; and a grasping portion located at an opposite end of the telescoping rod, the grasping portion comprising a movable portion having an ungrasped position and a grasped position, wherein the grasping portion is connected to the handling portion and the handling portion is configured to move the movable portion of the grasping portion from the ungrasped position to the grasped position.

In one aspect, the handling portion comprises a V-shaped gun mounting bracket. In one aspect, the telescoping sections are lockable by rotating them relative to each other. In one aspect, the telescoping rod is adjustable in length. In one aspect, the grasping portion is movable from a position inside the telescoping rod to outside the telescoping rod. In one aspect, the movable portion comprises a band that is configured to be loosened and tightened depending on a position of the handling portion. In one aspect, the movable portion comprises a loop that is configured to be moved from a position outside the telescoping rod toward the telescoping rod to thereby tighten a grip on the object. In one aspect, the movable portion comprises at least one of a spring and an elastic material. In one aspect, the device further comprises an apparatus configured to clamp down on a connection between the handling portion and the grasping portion so as to prevent the movable portion from moving from the grasped position.

In one aspect, a method of grasping an object comprises: providing a system for grasping the object, comprising: a telescoping rod comprising a plurality of telescoping sections slidably connected to and lockable relative to each other; a handling portion located at one end of the telescoping rod; and a grasping portion located at an opposite end of the telescoping rod, the grasping portion comprising a movable portion having an ungrasped position and a grasped position, wherein the grasping portion is connected to the handling portion and the handling portion is configured to move the movable portion of the grasping portion from the ungrasped position to the grasped position; mating the movable portion with the object; and moving the movable portion from the ungrasped position to the grasped position.

In one aspect, the method further comprises locking the movable portion in the grasped position. In one aspect, the object comprises a snake. In one aspect, the method further comprises extending the telescoping rod and locking the telescoping portions relative to each other.

These and other features, aspects and advantages of the present invention will become better understood with reference to the following drawings, description and claims.

BRIEF DESCRIPTION OF THE DRAWINGS

FIG. 1: is a perspective view of one embodiment of the invention shown in use in shooting-stick configuration.

FIG. 2: is a perspective view of one embodiment of the invention shown in use in snake-snaring configuration.

FIG. 3: is a perspective view of one embodiment of the invention shown in contracted configuration.

FIG. 9: is a perspective view of one embodiment of the invention illustrating a range of movements.

FIG. 10: is a perspective detail view of one embodiment of the invention.

FIG. 11A: is a section detail view of one embodiment of the invention long line 11-11 in FIG. 9.

FIG. 11B: is a detail view of one embodiment of the invention.

DETAILED DESCRIPTION OF THE INVENTION

Figure 4:
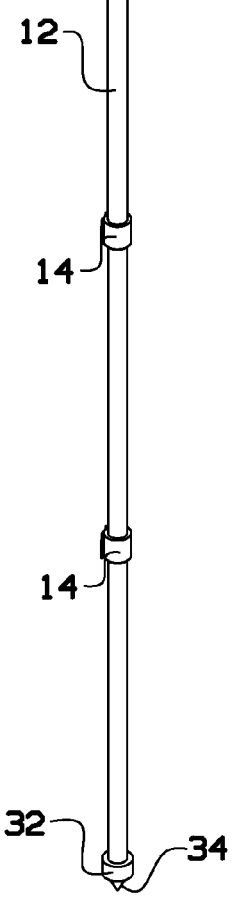
FIG. 4: is a perspective view of one embodiment of the invention shown in expanded configuration.
Figure 5:
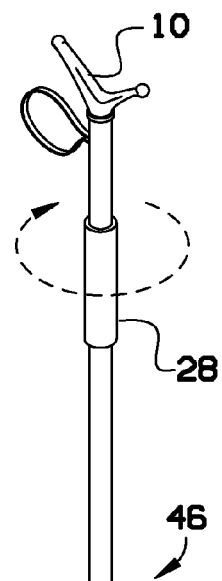
FIG. 5: is detail perspective view of one embodiment of the invention illustrating threaded cap 32 attached to telescopic shaft 12.
Figure 6:
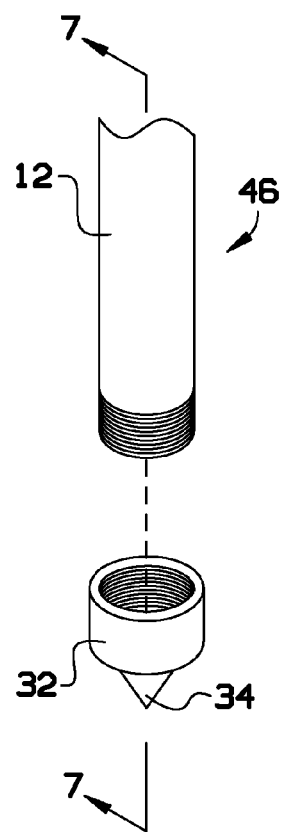
FIG. 6: is detail exploded view of one embodiment of the invention illustrating threaded cap 32 detached from telescopic shaft 12.

The following detailed description is of the best currently contemplated modes of carrying out exemplary embodiments of the invention. The description is not to be taken in a limiting sense, but is made merely for the purpose of illustrating the general principles of the invention.

Referring now to the figures, the following reference numbers may refer to elements of the invention:

10: is the V-shaped gun mounting bracket, which may be a handling portion.

12: are the telescopic sections.

14: are the telescopic shaft clamps.

16: is the strap, which may be made of nylon.

18: is the grommet, which may be made of plastic or metal.

20: is the hole for the strap.

22: is the wire, rod, rope, cable, or rigid material connecting the handling portion and the grasping portion.

24: is the slit.

26: is the shuttle.

28: is the handle, which may be made of a soft material such as foam.

30: is the friction ring, which may help to clamp to the wire 22.

32: is the cap, which may be threaded or otherwise detachable from the rod 46.

34: is the ground penetration spike.

38: is the crimp bracket.

40: is the wire or band loop, which is one embodiment of a grasping portion.

42: is the exemplary operator.

44: is the exemplary snake.

46: is the telescoping rod or telescopic rod, such as a snake snare/shooting stick.

48: is the exemplary weapon.

50: is the jaw, which is one embodiment of a movable portion of a grasping portion.

52: is a spring or elastic material.

54: is a bolt/nut/rivet/connector.

56: is a wire crimp.

58: is an opening.

60: is a steel pin.

62: are the slits.

64: are the slit protrusions for mating with the slits 62.

66: is the ring.

68: is the barrel wire termination.

70: is the metal lip.

72: is the movable wire.

The present invention provides one tool with many uses. If the present device is placed in a shooting stick it can be used in case of a snake encounter. Most hunters in the South or Midwest carry shooting sticks but not bulky straight shaft snake grabbers. Telescoping mechanisms can be used in a shooting stick for an example that can be expanded to extract snakes from areas safely with minimal risk. Also, this system can be modified for expandable parts grabbers, or it can be used as a tool for commercial fruit harvesters.

Many hunters carry shooting sticks that encounter dangerous snakes on pathways and ground blinds. Normally, hunters have no way to safely remove them from the ground blind. Shooting the snake would ruin the hunt. By using this system inside a shooting stick, risk can be mitigated and the stick may still look and feel like a shooting stick that can collapse into itself and fit into a day pack. This also enables hunters to carry only one tool instead of a shooting stick and something to remove dangerous snakes from harm's way.

Other systems do not transfer rotational or linear movement through telescoping poles without using hydraulic or external hoses. The other systems don't work well because they don't allow for working (transferring movement) at extended distances, nor can they double as a shooting stick and have it collapse on itself.

Also within the scope of the present invention are: snake stick; fruit harvester; shooting stick; parts grabber; etc.

One embodiment of the present invention may include the following, but is not limited to these aspects or features:

Round or rectangular telescoping poles (exterior poles)

Friction couplers (or any other couplers that are movable and lockable relative to each other) that combine each section Foam rubber (or other high-friction material) handles below rifle rest Removable (e.g., screw on/off) bottom cap with metal point or other means for ground penetration Various linear movement materials (e.g., handle, rationing rifle rest, or pull wrist strap)

Means for mechanical movement to transfer movement (e.g., cable, small telescoping poles, or rods that collapse into horizontal cylinders)

Half circle portion which may be a half inch across and ten inches long with cable coming out of bottom at an approximately 45 degree angle Tension spring or elastic material Wire, such as piano wire Screws for connection Hand strap (e.g., nylon) which may be a half inch wide and 20 inches long Various rubber and/or plastic grommets In using the present invention, to extract a snake from a hunting blind, one would first extend the shooting stick completely and unscrew the bottom cap. One of the five systems proposed (disclosed herein) may protrude from the bottom. Secondly, one of three types of movement elements (handle, rifle rest, or strap) can be twisted or pushed or pulled to transfer movement through cables or rods with cylinders, to open and close the system. Once the snake has been moved safely, the mechanism can be collapsed inside the shooting stick and stowed elsewhere.

In making the invention, one may start with a basic telescoping shooting stick and either attach a wire cable or two of the three end systems, disclosed herein. The handle may be manufactured the same as a normal shooting stick, as known in the art, but with slots on opposite sides of the top section to allow external and internal movement. The movement energy may be transferred by cables, antenna-like rods or other rods inside cylinders to open and close the bottom systems.

Each top and bottom system can potentially work independently of the others. The top systems may be designed to optimize linear movement but the bottom opening and closing systems may be interchangeable with linear movement designs, with the exception of the twisting cable design or the lower arm movement.

The present device can be collapsed and expanded without external wires, cables or hydraulic cables. This system could be used in several types of poles to pick up objects and can be used to transfer linear motion or rotational movement at least about twenty feet without external parts.

Figure 7:
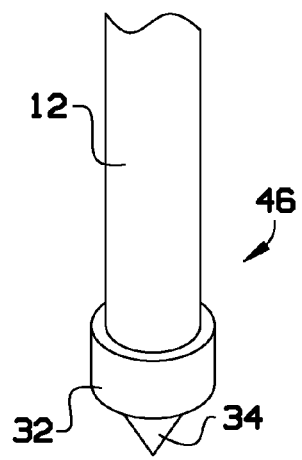
FIG. 7: is a section detail view of one embodiment of the invention along line 7-7 in FIG. 6 illustrated with wire loop 40 encased in telescopic shaft 12.
Figure 8:
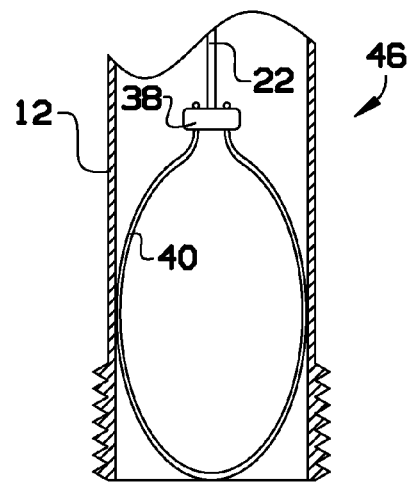
FIG. 8: is a section detail view of one embodiment of the invention along line 7-7 in FIG. 6 illustrated with wire loop 40 removed from telescopic shaft 12.
Figure 8:
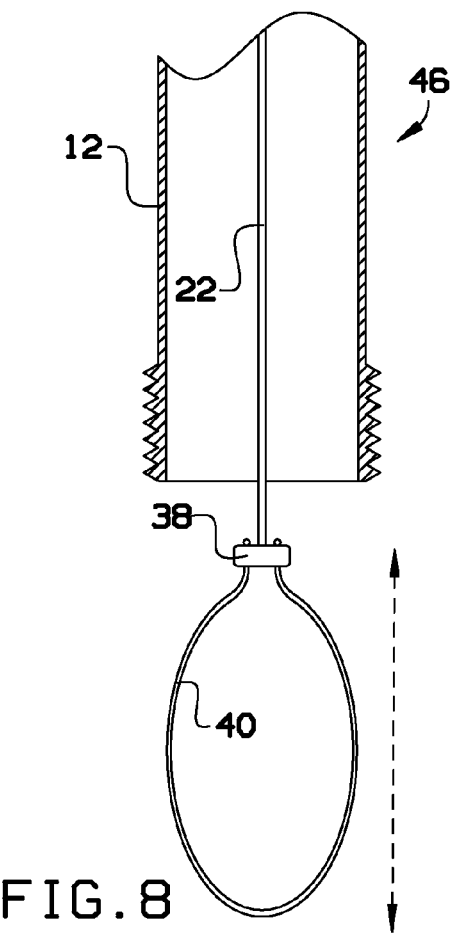

In one embodiment of the present invention, a system for grasping an object comprises a telescoping rod 46 comprising a plurality of telescoping sections 12 slidably connected to and lockable relative to each other, which may be cylindrical or any other shape known, and may comprise any rigid material (such as metal, plastic, etc.); a handling portion located at one end of the telescoping rod 46, which may comprise V-shaped gun mounting bracket 10 or any other handle; and a grasping portion located at an opposite end of the telescoping rod 46, which is configured to grasp an object. The grasping portion may comprise a movable portion having an ungrasped position (e.g., open position, not grasping an object) and a grasped position (e.g., closed position, grasping an object), and an example of a grasping portion with movable portion is shown in FIGS. 7 and 8 (with respect to wire/band loop 40), or in FIG. 12 (with respect to jaw 50 and spring 52 combination), or in FIGS. 14 and 15 (with respect to spring 52 and movable wire 72). Other grasping portions known within the art are within the scope of the present invention; it may include any device, apparatus, or means for grasping an object. In one aspect, the grasping portion is connected to the handling portion and the handling portion is configured to move the movable portion of the grasping portion from the ungrasped position to the grasped position.

In one aspect, the telescoping sections 12 are lockable by rotating them relative to each other, such as by inducing friction between them, or by utilizing rings 66 which have slits 62 and slit protrusions 64, either allowing relative motion between the sections 12 (such as when slits 62 and slit protrusions 64 are aligned), or locking them relative to each other (such as when slits 62 and slit protrusions 64 are not aligned). Other means of locking telescoping sections 12 and/or allowing them to move linearly relative to each other are within the scope of the present invention. The telescoping rod 46 may be adjustable in length, such as by moving the sections 12 relative to each other.

Figure 12:
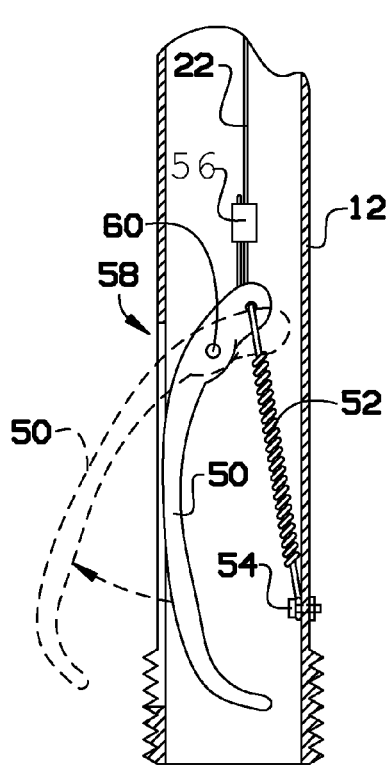
FIG. 12: is a detail view of an alternate embodiment of the invention.
Figure 13:
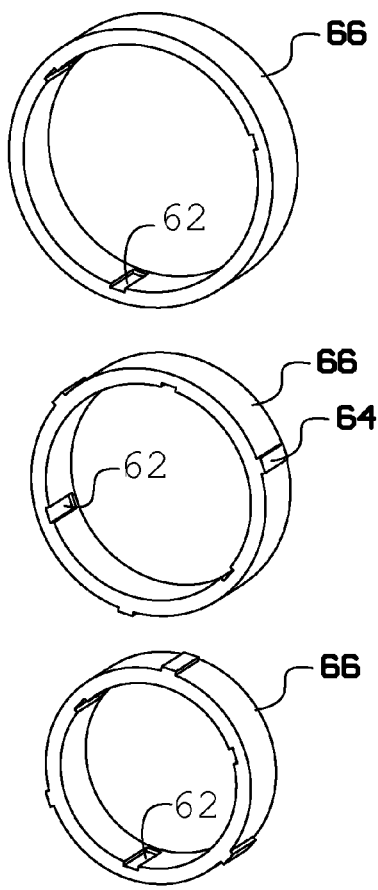
FIG. 13: is a detail view of an alternate embodiment of the invention.
Figure 15:
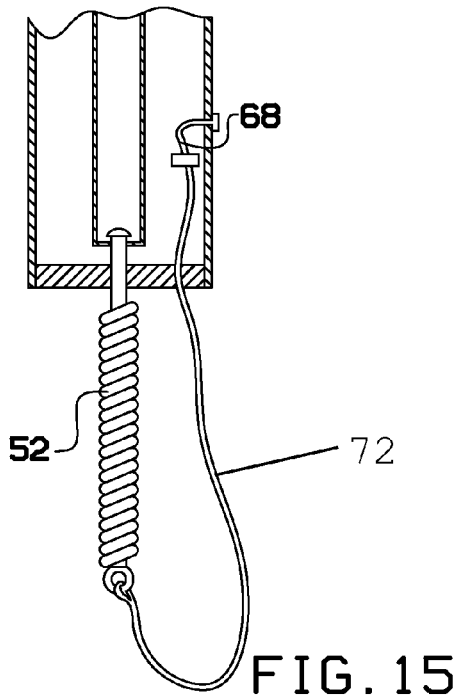
FIG. 15: is a detail view of an alternate embodiment of the invention.
Figure 14:
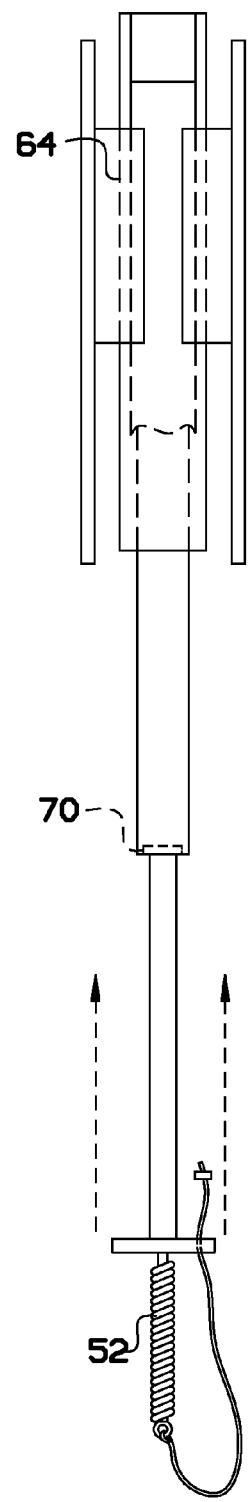
FIG. 14: is a detail view of an alternate embodiment of the invention.

In one aspect, the grasping portion is movable from a position inside the telescoping rod to outside the telescoping rod, such as shown in FIGS. 7 and 8, and also FIG. 12 (dotted lines versus solid lines), and also FIGS. 14 and 15. In one embodiment, pulling the strap 16 allows for moving the movable portion of the grasping portion from the ungrasped position to the grasped position, as shown in FIGS. 9 and 10. In one aspect, twisting the handle 28 allows for clamping down on the wire 22 to lock the movable portion in place, as shown in FIGS. 9 and 11A and 11B.

In one aspect, the system further comprises an apparatus (such as shown in FIGS. 11A and 11B), configured to clamp down on a connection (e.g., wire 22) between the handling portion and the grasping portion so as to prevent the movable portion from moving from the grasped position. The present invention includes any means or apparatus for locking the connection so as to allow the user to carry the object (e.g., wildlife, such as a snake) without having to continue to place pressure on the handling portion.

In one aspect, a method of grasping an object comprises providing an apparatus as described, mating the movable portion with the object, and moving the movable portion from the ungrasped position to the grasped position.

It should be understood, of course, that the foregoing relates to exemplary embodiments of the invention and that modifications may be made without departing from the spirit and scope of the invention.

What is claimed is:

1. A system for grasping an object, comprising:
    a telescoping rod comprising a plurality of telescoping sections slidably connected to and lockable relative to each other;
    a gun mounting bracket located at a first end of the telescoping rod, wherein the gun mounting bracket is shaped to receive and secure a gun within;
    a wrist strap located at the first end of the telescoping rod;
    a spiked bottom comprising a pointed tip at a second end of the telescoping rod opposite the first end;
    a grasping portion located near the second end of the telescoping rod, the grasping portion comprising a movable arm portion having an ungrasped position and a grasped position
    a cable within the telescoping rod running from the first end to the second end wherein said first end of said cable is attached to said wrist strap;
    a handle at the first end of the telescoping rod and rotatable about a center axis of the telescoping rod; and
    a clamp operably attached to the handle comprising a friction ring configured to clamp down on said cable,
    wherein the said wrist strap is configured transfer movement through the cable to move the movable arm portion of the grasping portion from the ungrasped position to the grasped position, and the handle is configured to twist about the center axis, thereby clamping the cable with the clamp and locking the movable arm portion in place.

2. The system as claimed in claim 1, wherein the gun mounting bracket comprises a V-shape.

3. The system as claimed in claim 1, wherein the telescoping sections are lockable by rotating them relative to each other.

4. The system as claimed in claim 1, wherein the telescoping rod is adjustable in length.

5. The system as claimed in claim 1, wherein the grasping portion is movable from a position inside the telescoping rod to outside the telescoping rod.

6. A method of grasping an object, comprising:
    providing a telescoping rod comprising a plurality of telescoping sections slidably connected to and lockable relative to each other; wherein said telescoping rod further comprises:
        a gun mounting bracket located at a first end of the telescoping rod,
        wherein the gun mounting bracket is shaped to receive and secure a gun within;
        a spiked bottom comprising a pointed tip at a second end of the telescoping rod opposite the first end;
        a grasping portion located near the second end of the telescoping rod, the grasping portion comprising a movable arm portion having an ungrasped position and a grasped position;
        a cable within the telescoping rod running from the first end to the second end wherein said first end of said cable is attached to said wrist strap;
        a handle at the first end of the telescoping rod and rotatable about a center axis of the telescoping rod; and
        a clamp operably attached to the handle comprising a friction ring configured to clamp down on said cable;
        wherein the strap is configured to move the movable arm portion of the grasping portion from the ungrasped position to the grasped position;
    positioning the movable arm portion in said ungrasped position such that the object is located between said movable arm portion and said second end of the telescoping rod;
    pulling said strap away from said telescopic rod with one hand to cause the cable to move the movable arm portion from the ungrasped position to the grasped position; and
    twisting the handle relative to the telescoping rod to cause said clamp frictionally engage and lock the cable in position relative to the telescoping rod, thereby locking the movable arm portion in the grasped position around the object.

7. The method as claimed in claim 6, wherein the object comprises a snake.

8. The method as claimed in claim 6, further comprising extending the telescoping rod and locking the telescoping sections relative to each other.

* * * * *